US010527333B2

(12) United States Patent
Jeong et al.

(10) Patent No.: US 10,527,333 B2
(45) Date of Patent: Jan. 7, 2020

(54) AIR CONDITIONER AND METHOD FOR CONTROLLING AN AIR CONDITIONER

(71) Applicant: LG ELECTRONICS INC., Seoul (KR)

(72) Inventors: Hojong Jeong, Seoul (KR); Kwangho Shin, Seoul (KR); Minho Chung, Seoul (KR); Song Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 217 days.

(21) Appl. No.: 14/991,135

(22) Filed: Jan. 8, 2016

(65) Prior Publication Data

US 2016/0223235 A1 Aug. 4, 2016

(30) Foreign Application Priority Data

Jan. 12, 2015 (KR) .................. 10-2015-0004227

(51) Int. Cl.
*F25B 27/02* (2006.01)
*F25B 41/04* (2006.01)
(Continued)

(52) U.S. Cl.
CPC .............. *F25B 47/025* (2013.01); *F24F 1/44* (2013.01); *F25B 13/00* (2013.01); *F25B 41/046* (2013.01);
(Continued)

(58) Field of Classification Search
CPC ........ F25B 2313/025; F25B 2313/0253; F25B 6/02; F25B 45/00; F25B 25/005;
(Continued)

(56) References Cited

U.S. PATENT DOCUMENTS 3,984,224 A 10/1976 Dawkins
4,051,691 A 10/1977 Dawkins
(Continued)

FOREIGN PATENT DOCUMENTS

CN 1403762 3/2003
CN 2600742 1/2004
(Continued)

OTHER PUBLICATIONS

Korean Office Action issued in Application No. 10-2015-0004227 dated Jan. 4, 2016.
(Continued)

*Primary Examiner* — Cassey D Bauer
*Assistant Examiner* — Miguel A Diaz
(74) *Attorney, Agent, or Firm* — Ked & Associates, LLP

(57) ABSTRACT

An air conditioner and a method for controlling an air conditioner are provided. The air conditioner may include an EHP outdoor device configured to drive a first compressor using electric power, and having a first heat exchanger that evaporates or condenses a refrigerant; a GHP outdoor device having an engine configured to drive a second compressor using a burned gas and a second heat exchanger that evaporates or condenses the refrigerant; and a flow rate balancing device configured to connect the first heat exchanger with the second heat exchanger, and to control a flow rate of the refrigerant through the EHP outdoor device and the GHP outdoor device.

20 Claims, 7 Drawing Sheets

(51) Int. Cl.
  *F25B 45/00* (2006.01)
  *F25B 47/02* (2006.01)
  *F25B 13/00* (2006.01)
  *F24F 1/44* (2011.01)
  *F25B 41/06* (2006.01)

(52) U.S. Cl.
  CPC ............ *F25B 41/062* (2013.01); *F25B 45/00* (2013.01); *F25B 2313/02532* (2013.01); *F25B 2313/02742* (2013.01); *F25B 2600/2515* (2013.01)

(58) Field of Classification Search
  CPC .. F25B 2400/0401; F25B 41/04; F25B 41/06; F25B 2345/00; F25B 2345/001; F25B 2345/002; F25B 2345/006; F24F 1/14; F24F 11/008; F24F 1/08; F24F 2011/0082; F24F 2011/0043; F24F 1/44; F24F 11/83; F24F 11/84; F24F 11/85; F24F 3/06; F24F 3/065; F24F 3/08; F24F 3/10; F24D 2220/0264
  See application file for complete search history.

(56) References Cited

U.S. PATENT DOCUMENTS

| | | | |
|---|---|---|---|
| 4,614,090 A | 9/1986 | Kaneko et al. | |
| 5,279,131 A * | 1/1994 | Urushihata | F24F 3/065 62/117 |
| 5,526,649 A * | 6/1996 | Sada | F24F 1/26 62/175 |
| 5,673,570 A * | 10/1997 | Sada | F04B 39/0207 62/468 |
| 6,202,431 B1 * | 3/2001 | Beaverson | F04D 27/0207 62/196.3 |
| 6,735,969 B2 | 5/2004 | Kasagi et al. | |
| 6,860,116 B2 * | 3/2005 | Lifson | F25B 1/00 62/117 |
| 9,909,784 B2 * | 3/2018 | Toya | F25B 5/04 |
| 2002/0050351 A1 | 5/2002 | Yoshimura et al. | |
| 2004/0050093 A1 * | 3/2004 | Lifson | F25B 1/00 62/498 |
| 2004/0134218 A1 * | 7/2004 | Alexandre | F25B 13/00 62/324.5 |
| 2005/0086954 A1 * | 4/2005 | Song | F24F 11/008 62/149 |
| 2005/0257565 A1 * | 11/2005 | Lee | F25B 13/00 62/510 |
| 2006/0117770 A1 * | 6/2006 | Park | F25B 13/00 62/175 |
| 2008/0034777 A1 | 2/2008 | Copeland et al. | |
| 2010/0107665 A1 * | 5/2010 | Kawano | F25B 13/00 62/149 |
| 2010/0198415 A1 * | 8/2010 | Kawano | F25B 13/00 700/282 |
| 2012/0102779 A1 * | 5/2012 | Beers | D06F 58/206 34/427 |
| 2014/0083126 A1 * | 3/2014 | Shimazu | F25B 41/06 62/324.6 |
| 2014/0116673 A1 | 5/2014 | Kang et al. | |
| 2014/0360222 A1 | 12/2014 | Masui | |
| 2015/0027154 A1 * | 1/2015 | Lee | F25B 30/02 62/160 |
| 2015/0089963 A1 * | 4/2015 | Tan | F24F 11/83 62/56 |
| 2016/0033158 A1 * | 2/2016 | Lu | F25B 23/006 165/218 |
| 2016/0201963 A1 * | 7/2016 | Shin | F25B 13/00 62/323.1 |
| 2016/0245536 A1 * | 8/2016 | Iwasaki | F25B 49/02 |
| 2016/0252261 A1 * | 9/2016 | Cha | F24F 1/0003 62/79 |
| 2016/0265821 A1 * | 9/2016 | Kimura | F25B 13/00 |
| 2016/0341450 A1 * | 11/2016 | Minami | F25B 49/022 |
| 2016/0356534 A1 * | 12/2016 | Hatada | F25B 13/00 |
| 2017/0067662 A1 * | 3/2017 | Guidetti | F24F 11/62 |
| 2017/0082334 A1 * | 3/2017 | Kawagoe | F25B 1/00 |
| 2018/0031287 A1 * | 2/2018 | Nagae | F25B 41/043 |
| 2018/0328636 A1 * | 11/2018 | Ohura | F25B 47/02 |

FOREIGN PATENT DOCUMENTS

| | | |
|---|---|---|
| CN | 101000182 | 7/2007 |
| CN | 101012989 | 8/2007 |
| EP | 1 202 005 | 5/2002 |
| EP | 1 288 592 | 3/2003 |
| EP | 1 628 094 | 2/2006 |
| EP | 1 882 890 | 1/2008 |
| EP | 1 882 891 | 1/2008 |
| JP | 07-332815 | 12/1995 |
| JP | 08-254371 | 10/1996 |
| JP | 11-315719 A | 11/1999 |
| JP | 2000-097515 | 4/2000 |
| JP | 2002-130743 | 5/2002 |
| JP | 2002-168539 | 6/2002 |
| JP | 2003-021416 | 1/2003 |
| JP | 2003-194384 | 7/2003 |
| JP | 2006-194467 | 7/2006 |
| JP | 2007-225141 | 9/2007 |
| JP | 2008-157557 | 7/2008 |
| JP | 2008-309383 | 12/2008 |
| JP | 2009-079813 | 4/2009 |
| JP | 2011-75162 | 4/2011 |
| JP | 2011075162 A * | 4/2011 |
| JP | 2012-007868 | 1/2012 |
| JP | 2014-092344 | 5/2014 |
| KR | 10-0199325 | 6/1999 |
| KR | 10-2004-0085540 | 10/2004 |
| KR | 10-2003-0077857 A | 5/2005 |
| KR | 10-2005-0043089 A | 5/2005 |
| KR | 10-2005-0112151 | 5/2006 |
| KR | 10-0575682 | 5/2006 |
| KR | 10-2007-0014952 | 2/2007 |
| KR | 10-0765563 | 10/2007 |
| KR | 10-2010-0002770 A | 1/2010 |
| KR | 20100002770 A * | 1/2010 |
| KR | 10-2010-0069188 | 6/2010 |
| KR | 10-2010-0129138 | 12/2010 |
| KR | 10-2014-0052339 A | 5/2014 |
| WO | WO 2008/084657 | 7/2008 |
| WO | WO 2014/065548 | 5/2014 |

OTHER PUBLICATIONS

Korean Notice of Allowance dated May 25, 2016.
European Search Report dated May 25, 2016.
European Search Report dated Jun. 23, 2016.
Korean Office Action dated Jun. 28, 2016.
Korean Office Action dated Aug. 12, 2016 issued in Application No. 10-2015-0004180.
Korean Office Action dated Nov. 27, 2015 issued in Application No. 10-2015-0004174.
Korean Notice of Allowance dated Jan. 10, 2017 issued in Application No. 10-2015-004275.
Korean Office Action issued in Application No. 10-2015-0004180 dated Dec. 4, 2015.
European Search Report dated May 13, 2016.
U.S. Appl. No. 14/990,570, filed Jan. 7, 2016.
U.S. Appl. No. 14/991,247, filed Jan. 8, 2016.
U.S. Appl. No. 14/922,460, filed Jan. 11, 2016.
U.S. Appl. No. 14/992,556, filed Jan. 11, 2016.
U.S. Appl. No. 14/993,693, filed Jan. 12, 2016.
U.S. Appl. No. 14/993,796, filed Jan. 12, 2016.
European Search Report dated May 31, 2016 (16150596.1).
European Search Reports dated May 31, 2016.
Korean Office Action dated Jul. 25, 2016.
European Search Report dated Jun. 23, 2016 issued in Application No. 16150587.0.

(56) References Cited

OTHER PUBLICATIONS

Korean Notice of Allowance dated Jul. 26, 2016 issued in Application No. 10-2015-0004223.
Korean Notice of Allowance dated Dec. 26, 2016 issued in Application No. 10-2015-0004175.
Korean Notice of Allowance dated Dec. 26, 2016 issued in Application No. 10-2015-0004178.
U.S. Office Action dated Jul. 6, 2017 issued in co-pending U.S. Appl. No. 14/992,460.
U.S. Office Action dated Jul. 12, 2017 issued in co-pending U.S. Appl. No. 14/992,556.
U.S. Notice of Allowance dated Jul. 18, 2017 issued in co-pending U.S. Appl. No. 14/993,796.
U.S. Notice of Allowance dated Mar. 15, 2018 issed in co-pending U.S. Appl. No. 14/990,570.
U.S. Notice of Allowance dated Sep. 7, 2017 issued in co-pending U.S. Appl. No. 14/993,693.
English Translation of JP 2011-075162 (previously cited on Aug. 11, 2016).
U.S. Office Action dated Jan. 12, 2018 issued in co-pending U.S. Appl. No. 14/991,247.
U.S. Notice of Allowance dated Apr. 20, 2018 issued in co-pending U.S. Appl. No. 14/992,556.
U.S. Office Action dated Dec. 11, 2017 issued in U.S. Appl. No. 14/992,556.
Chinese Office Action dated Apr. 18, 2018.

\* cited by examiner

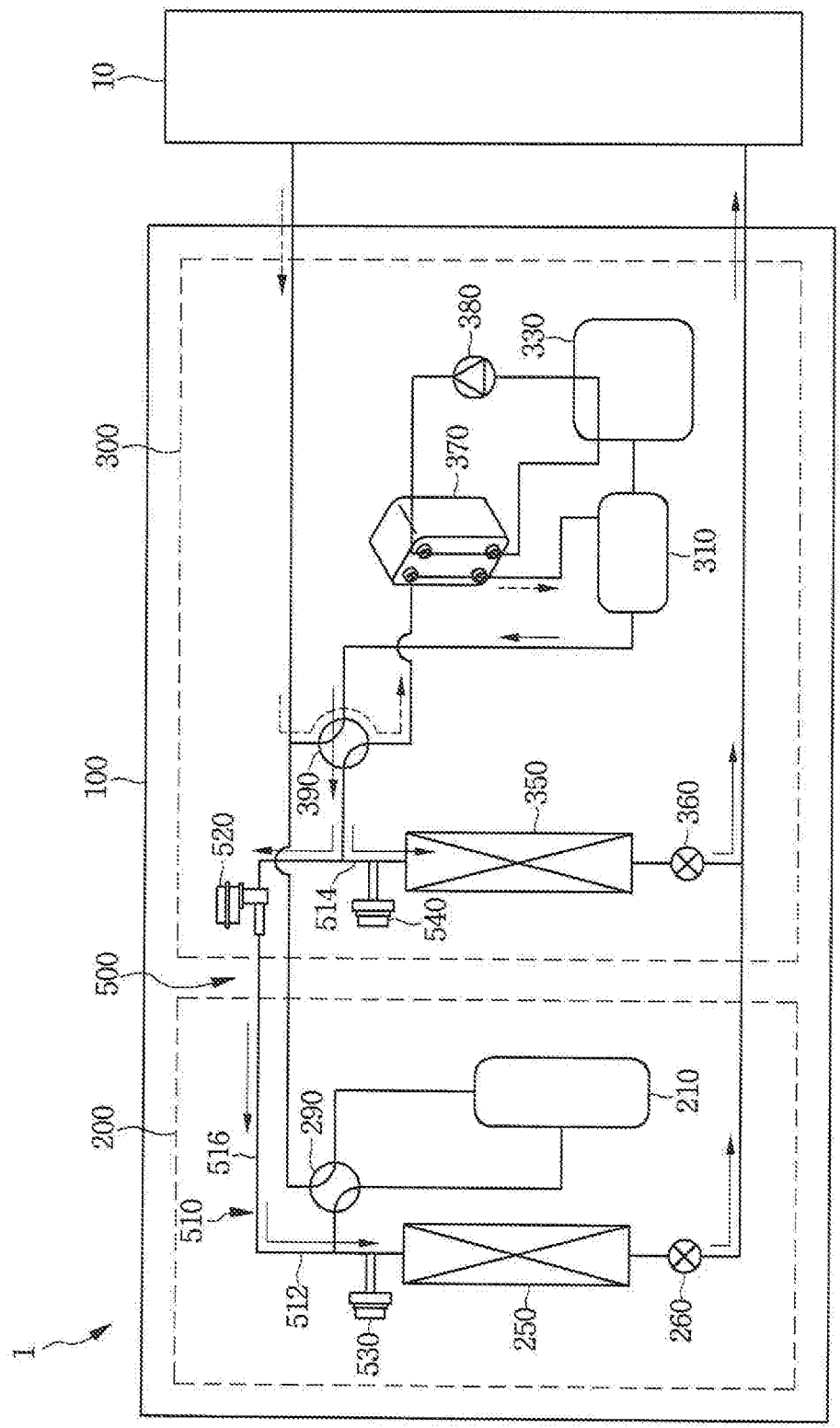

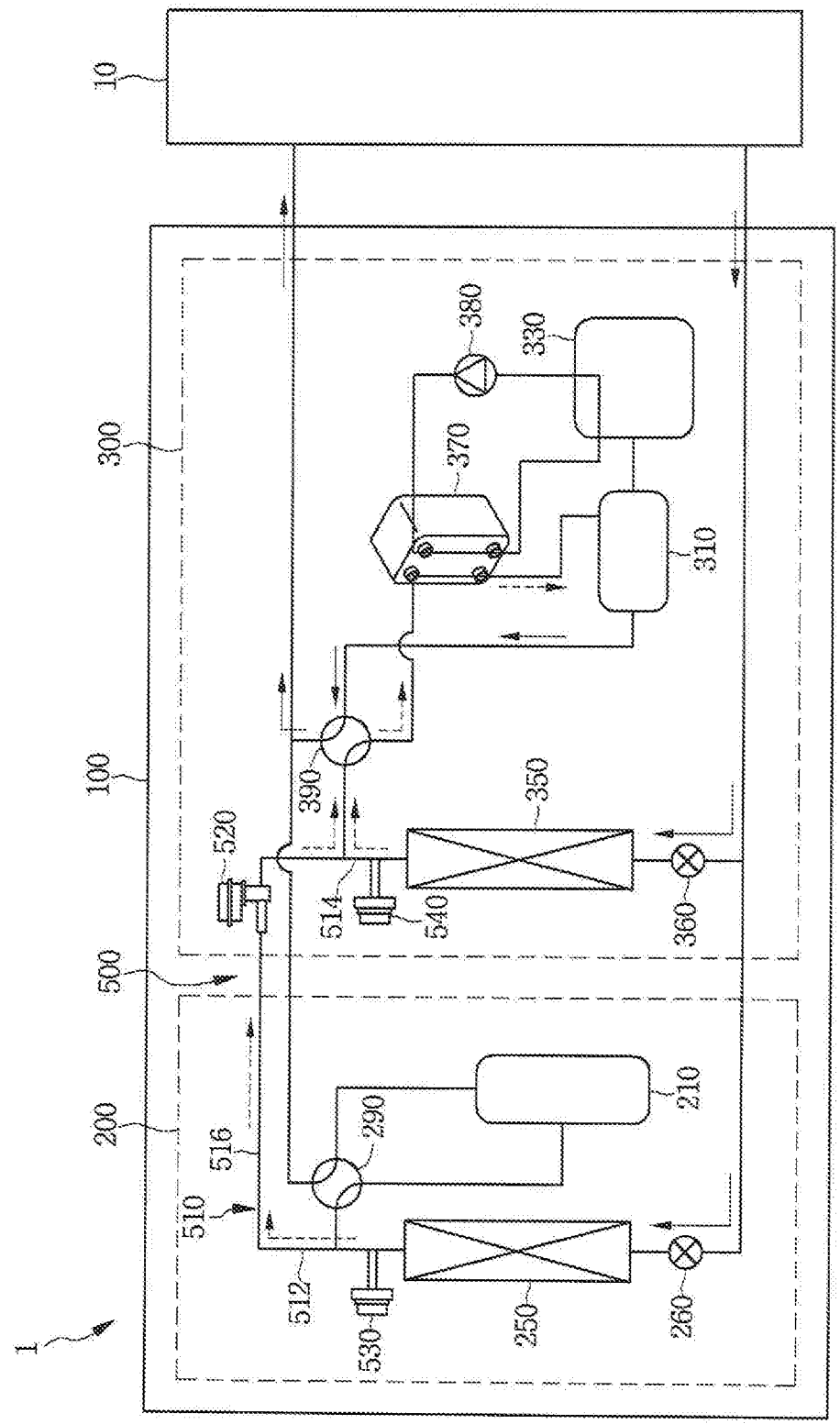

AIR CONDITIONER AND METHOD FOR CONTROLLING AN AIR CONDITIONER

CROSS-REFERENCE TO RELATED APPLICATION(S)

This application claims priority under 35 U.S.C. § 119 to Korean Application No. 10-2015-0004227, filed in Korea on Jan. 12, 2015, whose entire disclosure is hereby incorporated by reference.

BACKGROUND

1. Field

An air conditioner and a method for controlling an air conditioner are disclosed herein.

2. Background

An air conditioner is an apparatus that cools, warms, or purifies indoor air to provide a more comfortable indoor environment for a user. An air conditioner may be classified as an electric heat pump (EHP) type, which uses electric power or a gas heat pump (GHP) type, which uses a gas fuel, such as liquid petroleum gas (LPG) and liquefied natural gas (LNG), according to a power source for driving a compressor. In a GHP type, an engine is operated by burning a gas fuel, and thus, a compressor is driven.

A conventional EHP type air conditioner is disclosed in Korean Patent Application No. 10-2003-0077857, which is hereby incorporated by reference. In the conventional EHP type air conditioner, as the compressor may be easily controlled by adjusting a supply current, it is possible to respond to a partial load, and thus, the conventional EHP type air conditioner has high energy efficiency. However, in the EHP type air conditioner, there is a problem in that an outdoor heat exchanger is covered with frost when low temperature warming is performed.

A conventional GHP type air conditioner is also disclosed in Korean Patent Application No. 10-2003-0077857. As the conventional GHP type air conditioner uses waste heat of the engine, it has excellent defrosting performance, but there is a problem in that it has low engine efficiency due to heat loss, for example. Therefore, measures capable of providing an air conditioner having further improved performance and efficiency are required.

BRIEF DESCRIPTION OF THE DRAWINGS

Embodiments will be described in detail with reference to the following drawings in which like reference numerals refer to like elements, and wherein:

FIGS. 4 to 7 are schematic diagrams illustrating a flow of refrigerant according to a single operation mode of the air conditioner of FIG. 1.

DETAILED DESCRIPTION

In the following detailed description of embodiments, reference is made to the accompanying drawings that form a part hereof, and in which is shown by way of illustration embodiments which may be practiced. These embodiments are described in sufficient detail to enable those skilled in the art to practice the embodiments, and it is understood that other embodiments may be utilized and that logical structural, mechanical, electrical, and chemical changes may be made without departing from the spirit or scope. To avoid detail not necessary to enable those skilled in the art to practice the embodiments, the description may omit certain information known to those skilled in the art. The following detailed description is, therefore, not to be taken in a limiting sense, and the scope is defined only by the appended claims.

Figure 1:
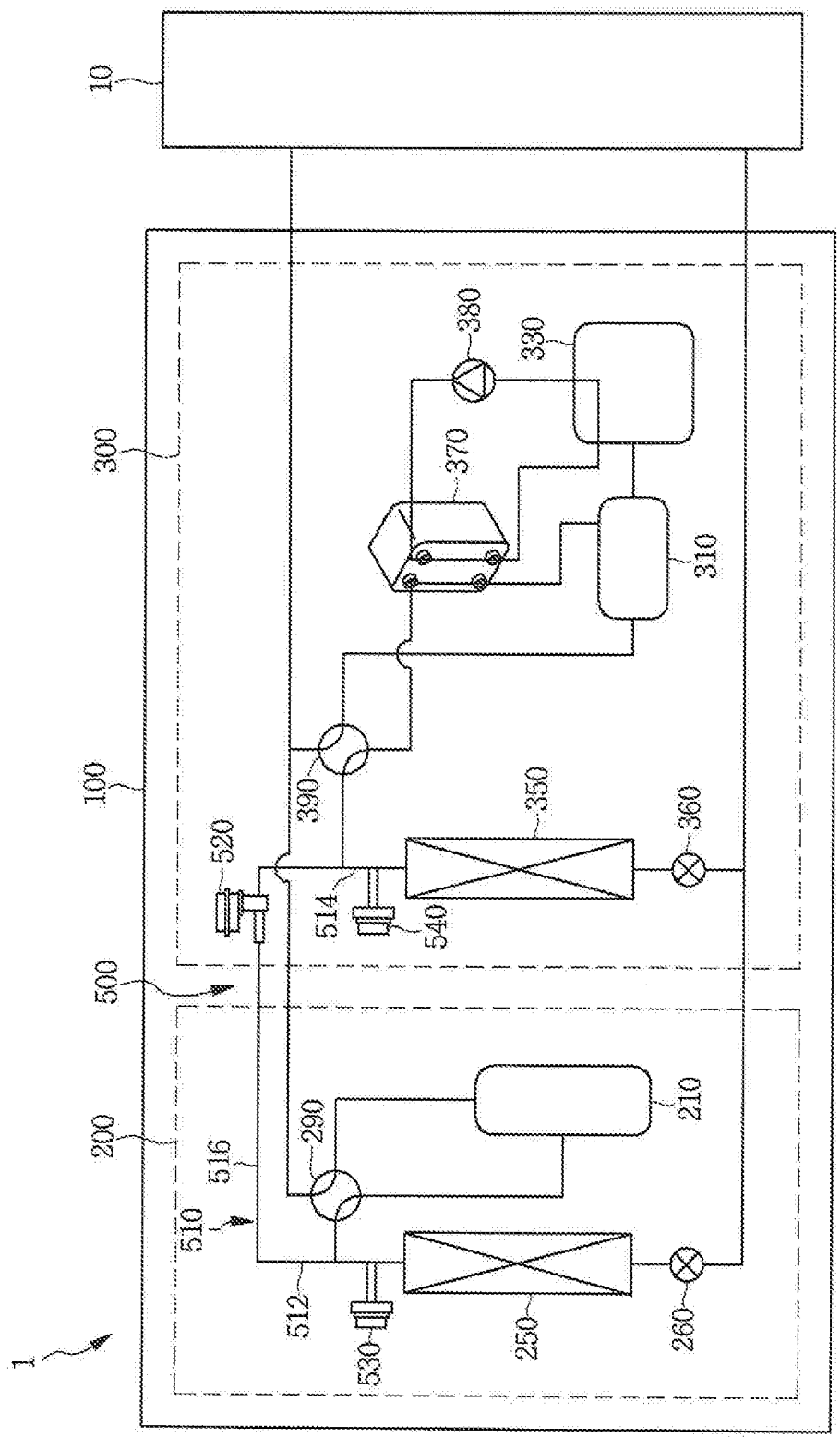
FIG. 1 is a schematic diagram of an air conditioner according to an embodiment.
Figure 2:
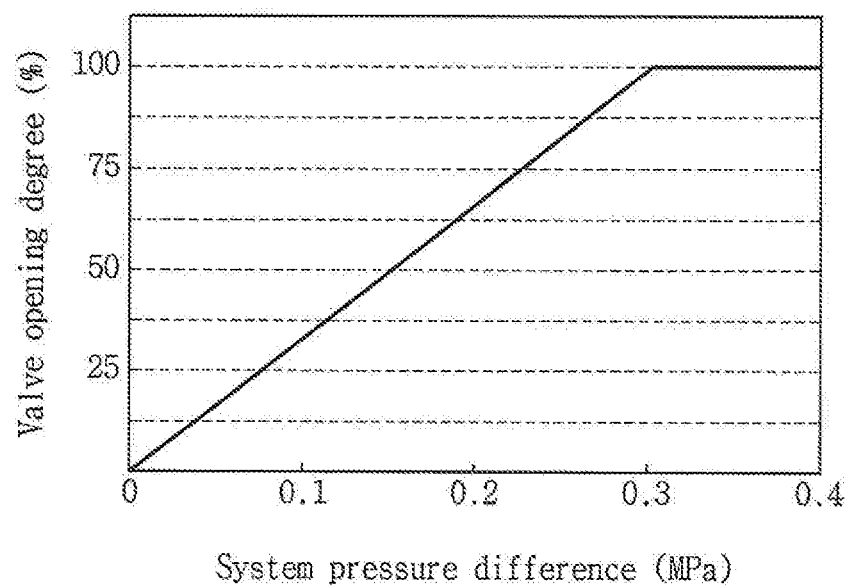
FIG. 2 is a graph showing valve open degree versus system pressure difference of a flow rate balancing valve of the air conditioner of FIG. 1.
Figure 3:
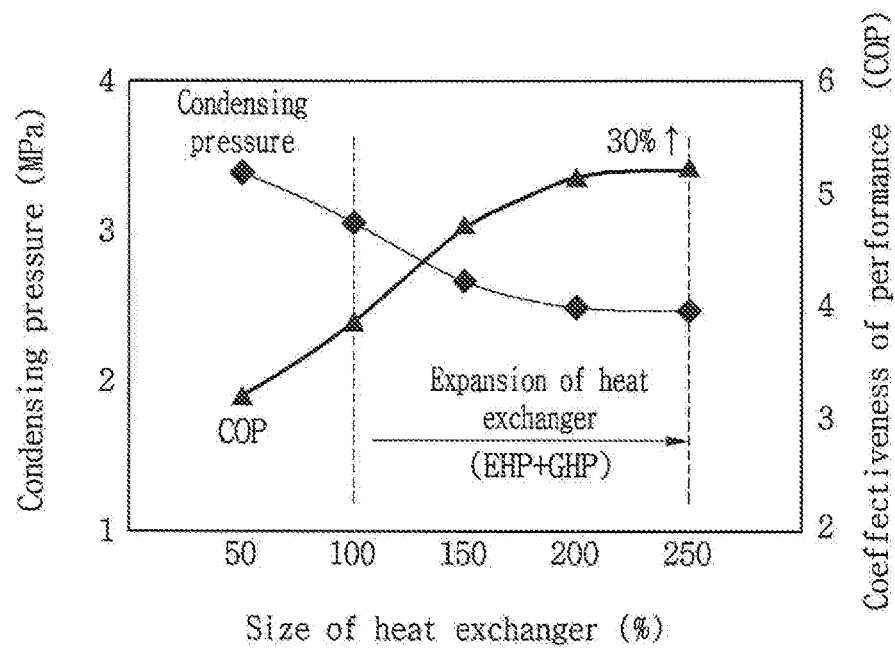
FIG. 3 is a view graph system efficiency in a partial load operation of the air conditioner of FIG. 1.

FIG. 1 schematic diagram of an air conditioner according to an embodiment. FIG. 2 is a graph showing valve open degree versus system pressure difference of a flow rate balancing valve of the air conditioner of FIG. 1. FIG. 3 is a graph illustrating system efficiency in a partial load operation of the air conditioner of FIG. 1.

Referring to FIGS. 1 to 3, the air conditioner 1 may include an indoor unit or device 10 and an outdoor unit or device 100. One or a plurality of indoor units 10 may be provided. The one or more indoor units 10 may be connected with the outdoor unit 100, and may cool, warm, or purify indoor air.

The outdoor unit 100 may be connected with the one or more indoor unit 10, and may perform compressing and expanding, for example, of a refrigerant to allow a sufficient heat exchanging operation of the indoor unit 10. A plurality of outdoor units 100 may be provided. Hereinafter, as an example, an embodiment having one pair of outdoor units 100 will be described.

The outdoor unit 100 may be a combined type including an electric heat pump (EHP) type using electric power and a gas heat pump (GHP) type using a gas fuel, such as LPG and LNG. The outdoor unit 100 may include an EHP outdoor unit or device 200, a GHP outdoor unit or device 300, and a flow rate balancing unit or device 500. The EHP outdoor unit 200 may be an outdoor unit operated using an EHP method, and may include a first compressor 210, a first heat exchanger 250, a first expansion valve 260, and a first four-way valve 290.

The first compressor 210 may compress the refrigerant, and may be driven by applying a voltage. That is, when the voltage is applied to the first compressor 210, the first compressor 210 may compress the refrigerant. The first heat exchanger 250 may be an outdoor heat exchanger, and may evaporate or condense the refrigerant according to a cooling operation or a warming operations of the conditioner 1. When the air conditioner 1 performs the cooling operation, the refrigerant may be condensed, and when the air conditioner 1 performs the warming operation, the refrigerant may be evaporated.

The expansion valve 260 may control a flow of the refrigerant to the first heat exchanger 250. As the first expansion valve 260 is well known, detailed description thereof has been omitted. The first four-way valve 290 may switch a passage of the refrigerant flowing in the EHP outdoor unit 200. The first four-way valve 290 may switch a passage of the refrigerant flowing to the indoor unit 10 and the refrigerant introduced from the indoor unit 10.

The GHP outdoor unit 300 may be an outdoor unit operated using a GHP method, and may include a second compressor 310, an engine 330, a second heat exchanger 350, a second expansion valve 360, a waste heat recovery heat exchanger 370, a cooling water pump 380, and a second four-way valve 390. The second compressor 310 may compress the refrigerant, and may be operated through driving of the engine 330, which will be described hereinafter. When a drive force is transmitted to the second compressor 310 by the engine 330, the second compressor 310 may compress the refrigerant, similar to the first compressor 210.

The engine 330 may transmit the drive force to the second compressor 310, and may be operated through burning of the gas fuel, such as LPG and LNG, The GNP outdoor unit 300 may be operated using the GHP method using the burned gas from the engine 330. The second heat exchanger 350 may be an outdoor heat exchanger, similar to the first heat exchanger 250, and may also be evaporate or condense the refrigerant according to the cooling operation or the warming operation of the air conditioner 1. When the air conditioner 1 performs the cooling operation, the refrigerant may be condensed, and when the air conditioner 1 performs the warming operation, the refrigerant may be evaporated.

The second expansion valve 360 may control a flow of the refrigerant to the second heat exchanger 350. As the second expansion valve 360 is also well known, similar to the first expansion valve 260, detailed description thereof has been omitted. The waste heat recovery heat exchanger 370 may be a heat exchanger that uses waste heat of the engine 330. The waste heat recovery heat exchanger 370 may absorb heat of the engine 330 overheated by driving of the engine 330 using cooling water, and thus, may cool the engine 330.

The cooling water pump 380 may provide a flowing force for the cooling water, and may be connected with the waste heat recovery heat exchanger 370. Therefore, the cooling water pump 380 may supply the cooling water to the waste heat recovery heat exchanger 370, The second four-way valve 390 may switch a passage of the refrigerant flowing in the GHP outdoor unit 300. The second four-way valve 380 may switch a passage of the refrigerant flowing to the indoor unit 10 and the refrigerant introduced from the indoor unit 10.

The flow rate balancing unit 500 may connect the fire heat exchanger 250 with the second heat exchanger 350, and may control a flow rate of the refrigerant of the EHP outdoor unit 200 and the GHP outdoor unit 300. Therefore, in this embodiment, when the EHP outdoor unit 200 and the GHP outdoor unit 300 are operated at a same time, a flow rate balance generated due to a pressure difference between both systems may be controlled through or by the flow rate balancing unit 500.

The flow rate balancing unit 500 may include a balancing pipe 510, a balancing valve 520, and a plurality of balancing sensors 530 and 540. The balancing pipe 510 may connect the first heat exchanger 250 of the EHP outdoor unit 200 with the second heat exchanger 350 of the GHP outdoor unit 300. The balancing pipe 510 may include a first pipe 512, a second pipe 514, and the third pipe 516. The first pipe 512 may be connected with the first heat exchanger 250 of the EHP outdoor unit 200. The second pipe 514 may be connected with the second heat exchanger 350 of the GHP outdoor unit 300. The third pipe 516 may connect the first pipe 512 with the second pipe 514.

The balancing valve 520 may be provided at or in the balancing pipe 510, and may include a valve, an opening degree of which may be varied to control the flow rate. The balancing valve 520 may be provided at or in the third pipe 516 of the balancing pipe 510, and may be provided at the GHP outdoor unit 300 side.

As illustrated in FIG. 2, the opening degree of the balancing valve 520 may be proportional to a pressure difference between systems, that is, a pressure difference between the EHP outdoor unit 200 and the GHP outdoor unit 300. In this embodiment, when the pressure difference between the EHP outdoor unit 200 and the GHP outdoor unit 300 is 0.3 MPa or more, the balancing valve 520 may be completely opened. Thus, in this embodiment, the opening degree of the balancing valve 520 may be properly controlled according to the pressure difference between the outdoor units 200 and 300, and thus, may control the flow rate balance appropriately.

The plurality of balancing sensors 530 and 540 may be pressure sensors that measure a pressure and may be provided at or in the balancing pipe 510. Hereinafter, an embodiment in which one pair of balancing sensors is provided will be described as an example.

The pair of balancing sensors 530 and 540 may include a list sensor 530 and a second sensor 540. The first sensor 530 may be provided at or in the first pipe 512, and may be provided close to the first heat exchanger 250. The second sensor 540 may be provided at or in the second pipe 514, and may be provided close to the second heat exchanger 350. The pressure of the EHP outdoor unit 200 and the GHP outdoor unit 300 may be measured by the first and second sensors 530 and 540, respectively.

The air conditioner 1 according to an embodiment may measure a pressure difference between the outdoor units 200 and 300 generated during an operation thereof via the flow rate balancing unit 500 in real time, and may control the flow rate balance in real time by properly changing the opening degree of the balancing valve 520. In addition, when only one of the EHP outdoor unit 200 and the GHP outdoor unit 300 is operated, the air conditioner 1 according to an embodiment may open the balancing valve 520 of the flow rate balancing unit 500 and may use both of the first and second heat exchangers 250 and 350.

As illustrated in FIG. 3, in a case in which only one heat exchanger is used, when it is assumed that a size (a HEX size) of the heat exchanger is 100%, both of the heat exchangers of the EHP outdoor unit 200 and the GHP outdoor unit 300 may be used in this embodiment, and thus, it may be possible to obtain an effect of expanding the heat exchanger. As such, in this embodiment, a condensing pressure may be reduced, and thus, a load in driving of the compressor may also be reduced, and a coeffectiveness of performance may be maximally enhanced by about 30%. In other words, in the air conditioner 1 according to this embodiment, a system efficiency of the air conditioner 1 may be maximally enhanced by about 30% in a partial load operation.

Hereinafter, operation in a single operation mode of the air conditioner 1 according to an embodiment will be described. FIGS. 4 to 7 are schematic diagrams illustrating a flow of a refrigerant according to a single operation mode of the air conditioner of FIG. 1.

First, a case in which the EHP outdoor unit 200 is operated, and the GHP outdoor unit 300 is stopped will be described. In FIGS. 4 to 7, a dotted line arrow may represent a low pressure refrigerant, and a solid line arrow may represent a high pressure refrigerant.

Figure 4:
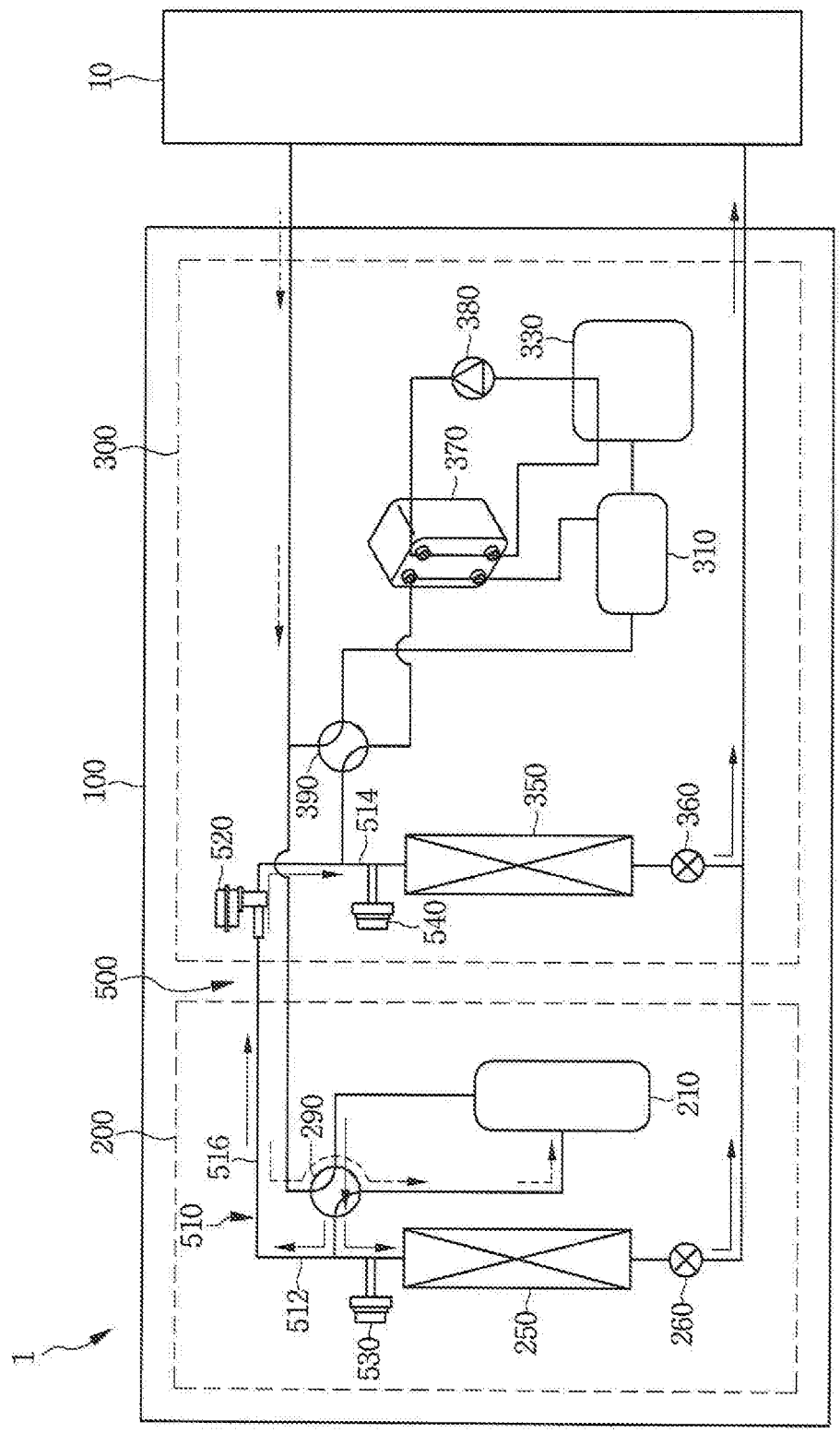

FIG. 4 illustrates the flow of the refrigerant when only the EHP outdoor unit 200 performs the cooling operation. Referring to FIG. 4, the low pressure refrigerant introduced from the indoor unit 10 may be introduced into the first compressor 210 of the EHP outdoor unit 200 via the first four-way valve 290 of the EHP outdoor unit 200. The high pressure refrigerant compressed by the first compressor 210 of the EHP outdoor unit 200 may then be branched toward the first heat exchanger 250 and the balancing pipe 510 of the flow rate balancing unit 500 via the first four-way valve 290.

The high pressure refrigerant branched toward the first heat exchanger 250 may be transferred to the indoor unit 10 via the first heat exchanger 250 and the first expansion valve 260. The high pressure refrigerant branched toward the balancing pipe 510 may pass through the first pipe 512 the third pipe 516, the flow rate balancing valve 520, and the second pipe 514, and may be introduced into the second heat exchanger 350 of the GHP outdoor unit 300. The high pressure refrigerant introduced into the second heat exchanger 350 may then be transferred to the indoor unit 10 via the second expansion valve 360.

Figure 5:
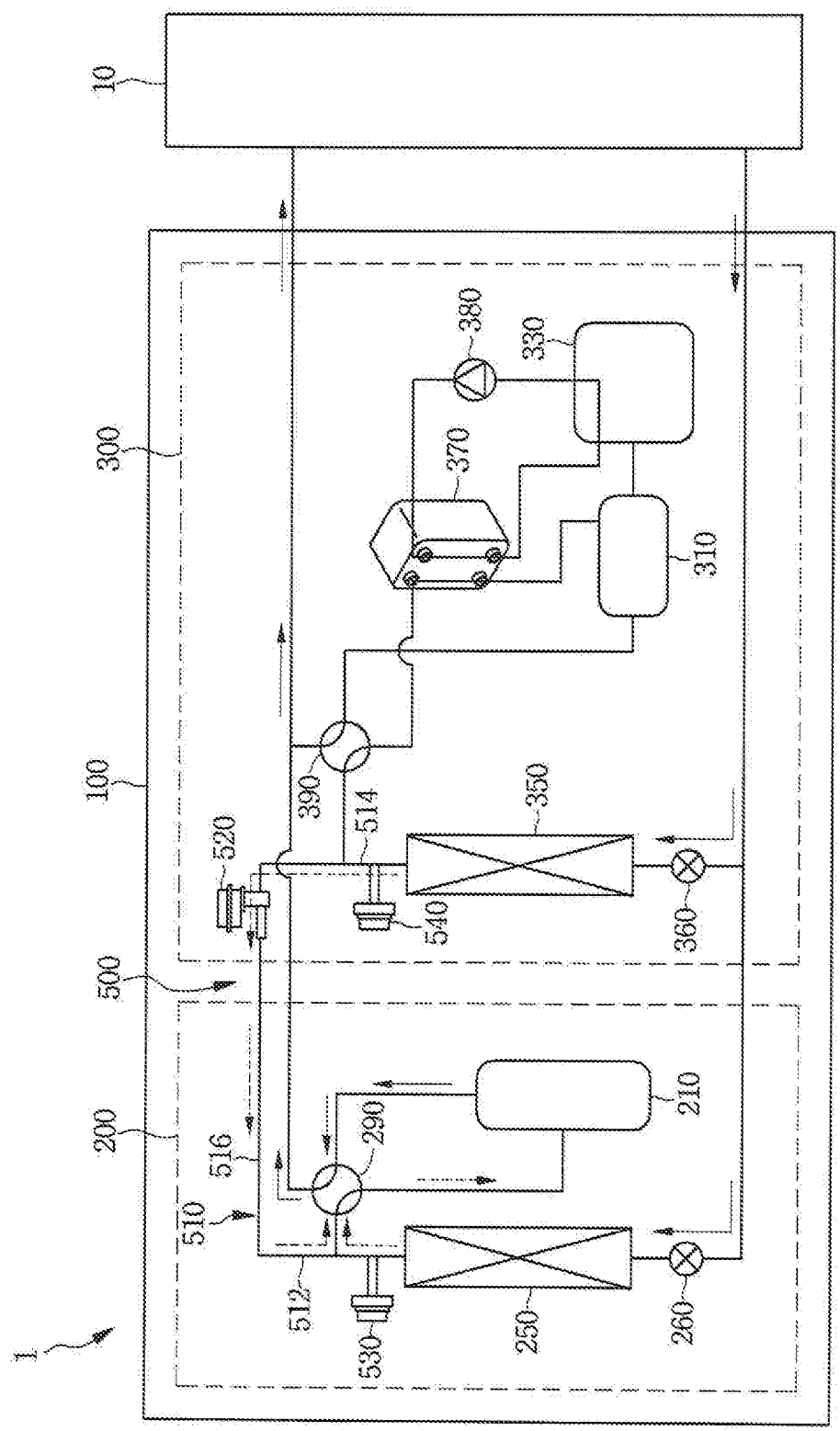

FIG. 5 illustrates the flow of the refrigerant when only the EHP outdoor unit 200 performs the warming operation. Referring to FIG. 5, the high pressure refrigerant flowing from the first compressor 210 of the EHP outdoor unit 200 may be introduced into the indoor unit 10 via the first four way valve 290. The high pressure refrigerant introduced from the indoor unit 10 may be branched toward the first expansion valve 260 of the EHP outdoor unit 200 and the second expansion valve 360 of the GHP outdoor unit 300, respectively.

The high pressure refrigerant branched toward the first expansion valve 260 of the EHP outdoor unit 200 may be introduced into the first heat exchanger 250 via the first expansion valve 260, and the high pressure refrigerant branched toward the second expansion valve 360 of the GHP outdoor unit 300 may be introduced into the second heat exchanger 350 via the second expansion valve 360. The low pressure refrigerant flowing from the first heat exchanger 250 may then be introduced into the first compressor 210 via the first four-way valve 290. The high pressure refrigerant compressed by the first compressor 210 may be introduced toward the indoor unit 10 via the first four-way valve 290.

The low pressure refrigerant flowing from the second heat exchanger 350 may be introduced into the first compressor 210 of the EHP outdoor unit 200 via the flow rate balancing unit 500. More specifically, the lo pressure refrigerant flowing from the second heat exchanger 350 may be introduced into the first compressor 210 via the second pipe 514, the balancing valve 520, the third pipe 516, the first pipe 512, and the first four-way valve 290. The high pressure refrigerant compressed by the first compressor 210 may be introduced toward the indoor unit 10 via the first four-way valve 290.

As described above, in the air conditioner 1 according to an embodiment, even when only the EHP outdoor unit 200 performs the cooling operation or the warming operation, the second heat exchanger 350 of the GHP outdoor unit 300 may be used together through, the flow rate balancing unit 500. In other words, in the air conditioner 1 according to an embodiment, even in a partial operation of only the EHP outdoor unit 200, it may be possible the double the heat exchanger size, and thus, a partial load efficiency may be remarkably enhanced.

Hereinafter, a case in which the EHP outdoor unit 200 may be stopped, and the GHP outdoor unit 300 may be operated will be described. FIG. 6 illustrates the flow of the refrigerant when only the GHP outdoor unit 300 performs the cooling operation. Referring to FIG. 6 the low pressure refrigerant introduced from the indoor unit 10 may be introduced into the second compressor 310 of the GHP outdoor unit 300 via the second four-way valve 390 and the waste heat recovery heat exchanger 370 of the GHP outdoor unit 300.

The high pressure refrigerant compressed by the second compressor 310 of the GHP outdoor unit 300 may then pass through the second four-way valve 390, and may be introduced into the balancing pipe 510 of the flow rate balancing unit 500. The high pressure, refrigerant introduced into the balancing pipe 510 may be branched toward the second heat exchanger 350 and the EHP outdoor unit 200.

More specifically, the high pressure refrigerant introduced into the second heat exchanger 350 may pass through the second expansion valve 360, and may be transferred to the indoor unit 10. The high pressure refrigerant branched toward the EHP outdoor unit 200 may be introduced into the first heat exchanger 250 of the EHP outdoor unit 200 via the second pipe 514, the balancing valve 520, the third pip 516 and the first pipe 512 of the balancing pipe 510. The high pressure refrigerant introduced into the first heat exchanger 250 of the EHP outdoor unit 200 may then pass through the first expansion valve 260. and may be transferred to the indoor unit 10.

FIG. 7 illustrates the flow of the refrigerant when only the GHP outdoor unit 300 performs the warming operation. Referring to FIG. 7, the high pressure refrigerant introduced into the indoor unit 10 may be branched toward the first expansion valve 260 of the EHP outdoor unit 200 and the second expansion valve 360 of the GHP outdoor unit 300, respectively.

The high pressure refrigerant branched toward the first expansion valve 260 of the EHP outdoor unit 200 may be introduced into the first heat exchanger 250 via the first expansion valve 260, and the high pressure refrigerant branched toward the second expansion valve 360 of the HP outdoor unit 300 may be introduced into the second heat exchanger 350 via the second expansion valve 360. The low pressure refrigerant flowing from the first heat exchanger 250 may be introduced into the GHP outdoor unit 300 through the flow rate balancing unit 500. More specifically, the low pressure refrigerant flowing from the first heat exchanger 250 may be introduced into the second compressor 310 of the GHP outdoor unit 300 via the first pipe 512, the third pipe 516 the balancing valve 520, and the second pipe 514 of the balancing pipe 510, the second four-way valve 390 of the GHP outdoor unit 300, and the waste heat recovery heat exchanger 370 of the GHP outdoor unit 300. The high pressure refrigerant compressed by the second compressor 310 may be introduced toward the indoor unit 10 via the second four-way valve 390.

The low pressure refrigerant flowing from the second heat exchanger 350 may be introduced into the second compressor 31 via the second pipe 514 of the balancing pipe 510, the second four-way valve 390, and the waste heat recovery heat exchanger 370. The high pressure refrigerant compressed by the second compressor 310 may be introduced toward the indoor unit 10 via the second four-way valve 390.

As described above, in the air conditioner 1 according to an embodiment, even when only the GHP outdoor unit 300 performs the cooling operation or the warming operation, the first heat exchanger 250 of the EHP outdoor unit 200 may also be used together through the flow rate balancing unit 500. In other words, in the air conditioner 1 according to this embodiment, even in a partial operation of only the GHP outdoor unit 300, it may be possible to double the heat exchanger size, and thus, the partial load efficiency may be remarkably enhanced, When only one of the EHP outdoor unit 200 and the GHP outdoor unit 300 of the outdoor unit 100 may be operated, the air conditioner 1 according to this embodiment may remarkably enhance the partial load efficiency using the heat exchanger provided at the stopped outdoor unit side.

An air conditioner according to embodiments disclosed herein is capable of further improving performance and efficiency.

Embodiments disclosed herein provide an air conditioner that may include an EHP outdoor unit or device configured to drive first compressor using electric power, and having a first heat exchanger that evaporates or condenses a refrigerant; a GHP outdoor unit or device having an engine configured to drive a second compressor through a burned gas and a second heat exchanger that evaporates or condenses the refrigerant; and a flow rate balancing unit or device configured to connect the first heat exchanger with the second heat exchanger, and to control a flow rate of the refrigerant of the EHP outdoor unit and the GHP outdoor unit. The flow rate balancing unit may include a balancing pipe configured to connect the first heat exchanger with the second heat exchanger, and a balancing valve provided at the balancing pipe and configured to vary an opening degree. The flow rate balancing unit may include at least one pair of balancing sensors provided at the balancing pipe and disposed or provided close to the first and second heat exchangers. The opening degree of the balancing valve may be proportional to a pressure difference between the EHP outdoor unit and the GHP outdoor unit.

The balancing valve may be completely opened when the pressure difference between the EHP outdoor unit and the GHP outdoor unit is about 0.3 MPa or more. The balancing pipe may include a first pipe connected with the first heat exchanger, a second pipe connected with the second heat exchanger, and a third pipe configured to connect the first pipe with the second pipe. The balancing valve may be provided at the third pipe. The balancing sensors may be provided at the first and second pipes, respectively. The balancing sensors may be pressure sensors. The balancing valve may be provided at the GHP outdoor unit side. The first and second heat exchangers may be outdoor heat exchangers. According to embodiments disclosed herein, an air conditioner capable of further improving performance and efficiency may be provided.

Even though all elements of embodiments may be coupled into one or operated in the combined state, embodiments are not limited to such embodiments. That is, all elements may be selectively combined with, each other without departing the scope. Further. when it is described that one comprises (or comprises or has) some elements, it should be understood that it may comprise (or include or have) only those elements, or it may comprise (or include or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner, comprising:
    an electronic heat pump (EHP) outdoor device configured to drive a first compressor using electric power, and having a first heat exchanger that performs heat exchange with a refrigerant;
    a gas heat pump (GHP) outdoor device including an engine configured to drive a second compressor using a burned gas and a second heat exchanger that performs heat exchange using the refrigerant; and
    a flow rate balancing device configured to connect the first heat exchanger with the second heat exchanger, and to control a flow rate of the refrigerant through the EHP outdoor device and the GHP outdoor device, wherein the flow rate balancing device includes:
        a balancing pipe configured to connect the first heat exchanger with the second heat exchanger; and
        a balancing valve installed at the balancing pipe and configured to have a variable opening degree, wherein the opening degree of the balancing valve is proportional to a pressure difference between the EHP outdoor device and the GHP outdoor device when both the EHP and the GHP outdoor devices are operated simultaneously.

2. The air conditioner according to claim 1, wherein the balancing valve operates such that the balancing valve is completely opened when the pressure difference between the EHP outdoor device and the GHP outdoor device is 0.3 MPa or more.

3. The air conditioner according to claim 1, wherein the balancing valve is installed in the GHP outdoor device.

4. The air conditioner according to claim 1, wherein at least one of the first heat exchanger and the second heat exchanger is an outdoor heat exchanger.

5. The air conditioner according to claim 1, wherein when the pressure difference between the EHP outdoor device and the GHP outdoor device is 0.3 MPa or more, the balancing valve is completely opened (100%), and
    when there is no pressure difference (0 MPa) between the EHP outdoor device and the GHP outdoor device, the balancing valve is completely closed (0%).

6. The air conditioner according to claim 5, wherein the opening degree of the balancing valve is linearly changed within a range of pressure difference between the EHP outdoor device and the GHP outdoor device of 0 to 0.3 MPa.

7. The air conditioner according to claim 1, wherein the flow rate balancing device includes at least one pair of balancing sensors installed on the balancing pipe and provided adjacent to the first and second heat exchangers.

8. The air conditioner according to claim 7, wherein the at least one pair of balancing sensors is pressure sensors.

9. The air conditioner according to claim 7, wherein the balancing pipe includes:
    a first pipe connected with the first heat exchanger;
    a second pipe connected with the second heat exchanger; and
    a third pipe configured to connect the first pipe with the second pipe.

10. The air conditioner according to claim 9, wherein the balancing valve is provided at the third pipe.

11. The air conditioner according to claim 9, wherein the at least one pair of balancing sensors is provided at the first and second pipes, respectively.

12. A method for controlling an air conditioner including an electronic heat pump (EHP) outdoor device configured to drive a first compressor using electric power, and having a first heat exchanger that performs heat-exchange with a refrigerant; a gas heat pump (GHP) outdoor device including an engine configured to drive a second compressor using a burned gas, and a second heat exchanger that performs heat-exchange with the refrigerant; and a flow rate balancing device configured to connect the first heat exchanger with the second heat exchanger, the method comprising:
 driving the GHP outdoor device and the EHP outdoor device simultaneously; and
 controlling a flow rate of the refrigerant of the GHP outdoor device and the EHP outdoor device via the flow rate balancing device to control a flow rate balance of the air conditioner, wherein the flow rate balancing device includes:
  a balancing pipe configured to connect the first heat exchanger with the second heat exchanger; and
  a balancing valve provided at the balancing pipe and configured to have a variable opening degree, wherein the opening degree of the balancing valve is proportional to a pressure difference between the EHP outdoor device and the GHP outdoor device when both the EHP and the GHP outdoor devices are operated simultaneously.

13. The method according to claim 12, wherein controlling the flow rate of the refrigerant of the GHP outdoor device and the EHP outdoor device via the flow rate balancing device to control the flow rate balance of the air conditioner includes completely opening the balancing valve when the pressure difference between the EHP outdoor device and the GHP outdoor device is 0.3 MPa or more.

14. The method according to claim 12, wherein when the pressure difference between the EHP outdoor device and the GHP outdoor device is 0.3 MPa or more, the balancing valve is completely opened (100%), and
 when there is no pressure difference (0 MPa) between the EHP outdoor device and the GHP outdoor device, the balancing valve is completely closed (0%).

15. The method according to claim 14, wherein the opening degree of the balancing valve is linearly changed within a range of pressure difference between the EHP outdoor device and the GHP outdoor device of 0 to 0.3 MPa.

16. The method according to claim 12, wherein the flow rate balancing device includes at least one pair of balancing sensors installed in the balancing pipe and provided adjacent to the first and second heat exchangers.

17. The method according to claim 16, wherein the at least one pair of balancing sensors is pressure sensors.

18. The method according to claim 16, wherein the balancing pipe includes:
 a first pipe connected with the first heat exchanger;
 a second pipe connected with the second heat exchanger; and
 a third pipe configured to connect the first pipe with the second pipe.

19. The method according to claim 18, wherein the balancing valve provided at the third pipe.

20. The method according to claim 18, wherein the at least one pair of balancing sensors is provided at the first and second pipes, respectively.

* * * * *